Aug. 1, 1961 A. J. KLINE, JR., ET AL 2,994,855

PULSE GENERATOR

Filed April 5, 1956 2 Sheets-Sheet 1

INVENTORS
FRANK C. HASSETT &
ARTHUR J. KLINE, JR.

BY Morris B. Rabkin

ATTORNEY

INVENTORS.
FRANK C. HASSETT &
ARTHUR J. KLINE, JR.
BY Morris A. Rabkin
ATTORNEY.

United States Patent Office 2,994,855

Patented Aug. 1, 1961

2,994,855

PULSE GENERATOR

Arthur J. Kline, Jr., Phoenix, Ariz., and Frank C. Hassett, Audubon, N.J., assignors to Radio Corporation of America, a corporation of Delaware Filed Apr. 5, 1956, Ser. No. 576,394

19 Claims. (Cl. 340—174)

This invention relates to pulse generators, and more particularly to the utilization of magnetic cores to form a timing pulse generator.

Magnetic elements of the type having a rectangular hysteresis loop are finding wide application in the field of electronics. One such application is in magnetic shift registers. In the application of magnetic cores to circuit functions, magnetic core elements have been termed magnetic gates, magnetic amplifiers, and magnetic cores, depending upon the particular application in which they are employed.

It has been proposed in an article by Kodis, Gutterman, and Ruhman entitled "Logic and Control Functions Performed with Magnetic Cores," found in the March 1953 issue of the "Proceedings of the I.R.E.," that magnetic shift registers be utilized for the generation of clock pulses (that is, timing pulses) sequentially and synchronously, in a plurality of parallel output channels. The authors Gutterman, Kodis, and Ruhman suggest that a simple method of constructing a timing pulse generator is to connect a closed ring of shift register stages in which the desired information (or timing) pattern (usually a single "one") is written initially and then circulated by the shift pulses. The pattern of a single "one" is repeated at the output of each stage of the ring, but appears with a different timing (phase). A disadvantage of using a closed ring is that once an error occurs (for example, introduction of an extraneous "one," or loss of a "one") the circulated pattern remains incorrect until the correct pattern is reinserted.

Accordingly, it is an object of this invention to provide a shift register timing pulse generator that minimizes the occurrence of spurious timing pulses.

Another object of this invention is to provide a magnetic shift register timing pulse generator that is self-starting.

An additional object of this invention is to provide a magnetic shift register clock pulse generator that prevents spurious signals from occurring over more than one cycle of the generator.

Still another object of this invention is to provide a magnetic shift register clock pulse generator for generating synchronous clock pulses, which generator is reliable, economical, and simple.

In accordance with one embodiment of this invention, a magnetic core timing pulse generator is provided. This timing pulse generator consists of a magnetic shift register wherein each of the magnetic shift elements making up the register are connected in cascade. The shift register may be either of the one core per bit or the delay gate types. The output of each stage (shift element) provides one timing pulse and in addition is returned to the input of a complementing circuit (negation gate). The output of the complementing circuit introduces successive synchronizing pulse signals into the first stage of the register. Since the function of a complementing circuit is to provide an output only in the absence of inputs, the input to the register introduces a new timing pulse to be shifted through the register only after a prior timing pulse signal is completely shifted through the register. Stated in another manner, the first pulse from a pulse source enters the shift register and then the source is effectively removed until the first pulse is completely shifted out of the shift register. The source is then effectively reconnected and another pulse enters the shift register. The source never enters more than one pulse into the shift register during an iteration and if a spurious pulse does appear in an iteration, it will disappear at the end of the iteration.

In other embodiments of this invention, any of the well known types of shift registers employing vacuum tubes, transistors, or other shift elements may be used.

The novel features of this invention as well as the invention itself, both as to its organization and method of operation, will best be understood from the following description, when read in connection with the accompanying drawings, in which like reference numerals refer to like parts, in which.

Magnetic core shift registers are especially advantageous for use in this invention, and may include shift elements (stages) of the delay gate type or of the one core per bit type. However, other types of shift registers may also be employed in practicing the invention. A magnetic shift register using the one core per bit shift element is described in an article by Gutterman, Kodis, and Ruhman, found in I.R.E. Convention Record, part 7, 1953, on pages 38–42. A description of the delay gate type magnetic shift register employed in alternative embodiments of this invention may be found in an article by R. A. Ramey entitled "The Single Core Magnetic Amplifier as a Computer Element," published in the January 1953 edition of "Communications and Electronics," volume 71, part I, Transactions of the American Institute of Electrical Engineers, 1952, on pages 442–446.

Figure 1:
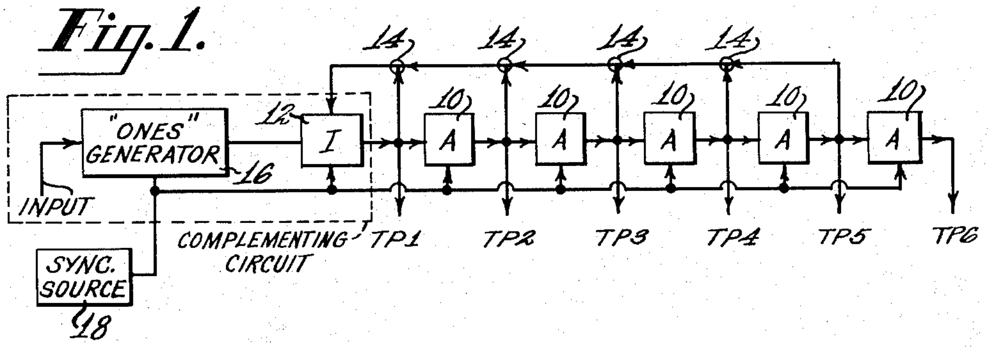
FIGURE 1 is a block diagram illustrating an embodiment of the invention utilizing the one core per bit type of magnetic element.

A shift register of the one core per bit type is shown in block form in FIGURE 1. Each of the magnetic amplifiers 10 making up a portion of the shift register are denoted by blocks having the large letter A placed therein. As stated above, in the field of magnetics the various terms of magnetic amplifier, magnetic gate, magnetic element, and magnetic core have been applied to the magnetic circuits utilized in various applications. For the purposes of description, in order to distinguish between the magnetic elements, the letter A is employed to denote the one core per bit type of magnetic amplifier, and the letter D is employed to denote the delay type of magnetic circuit.

The first stage 12 of the shift register of FIGURE 1 is an inhibit gate which is denoted by the letter I. An inhibit circuit which is suitable for use herein is described on page 293 of the above-mentioned Kodis, Gutterman, and Ruhman article. Such a circuit may comprise simply an input winding to a given magnetic core which functions to cancel the effect of the normal input winding to that core, as described in the article. Each of the magnetic amplifiers 10 and the inhibit gate 12 are connected in cascade. The output of the inhibit gate 12 and of each of the magnetic amplifiers 10 provides one of the timing pulses TP1 through TP6, respectively. The output of the inhibit gate 12 and the respective outputs of the magnetic amplifiers 10 are also connected through buffer gates (sometimes known as an "or" circuit) 14 to the inhibit input of the inhibit gate 12. The normal input to the inhibit gate 12 is provided by the "ones" generator 16. This "ones" generator may be either self-starting or non-self-starting. The "ones" generator 16 illustrated is assumed to be not self-starting and requires the introduction of a single pulse to the input winding (indicated as "input") to start. Each of the shift windings (not shown) of the shift register elements 10, 12, and 16 is fed by shift is fed by shift pulses. These shift pulses are the synchronizing signal from a synchronizing signal source 18.

In operation, the shift windings (not shown) of the shift register of FIGURE 1 are fed by a train of pulses. With the introduction of a single input pulse, the "ones" generator 16 provides a train of continuous "ones" in synchronism with the shift pulses. The first "one" from the "ones" generator 16 is introduced to the input of the inhibit gate 12. The combination of "ones" generator 16 and the inhibit gate 12 form a complementing circuit, which now provides a first timing pulse TP1. The output of the complementing circuit (the output of the inhibit gate 12) is also coupled to the first of the magnetic amplifiers 10, and through corresponding "or" circuit 14, to one of its own inputs (the inhibit input of the inhibit gate 12). Because of this feedback to the inhibit input of gate 12, on the occurrence of the next "one" from the "ones" generator (and correspondingly the next shift pulse), no output is provided by the complementing circuit. However, the first of the magnetic amplifiers 10 provides the second timing pulse TP2, another inhibit signal to the complementing circuit, and an input to the next successive magnetic amplifier 10. The next successive magnetic amplifier 10, in turn, provides the third timing pulse TP3 upon the occurrence of the third successive shift pulse. Thus, the first pulse presented by the complementing circuit passes to the remaining stages of the shift register in succession. The outputs from these remaining stages (magnetic amplifiers 10), being fed back to the complementing circuit, are complemented and no further pulses (from the "ones" generator 16) are allowed to enter the register. Therefore, the first pulse from the "ones" generator 16 enters the shift register and is shifted through the register. Only after this pulse leaves the register is another pulse allowed to enter through the complementing circuit.

If two or more pulses are entered within a given cycle into the shift register, the error is corrected on the succeeding cycle. Thus, if a spurious pulse is entered, for some external reason, this situation cannot exist for more than one cycle. As long as a single "one" is present in any stage in the shift register, no "ones" can pass through the inhibit gate 12.

Figure 2:
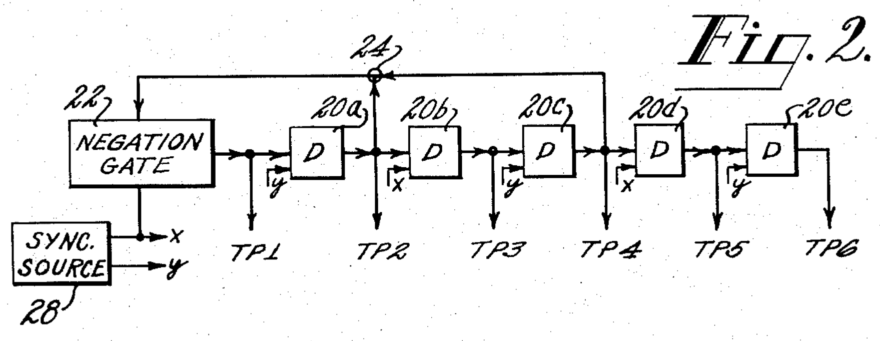
FIGURE 2 is a block diagram illustrating another embodiment of this invention utilizing the delay gate type of magnetic element.
Figure 3:
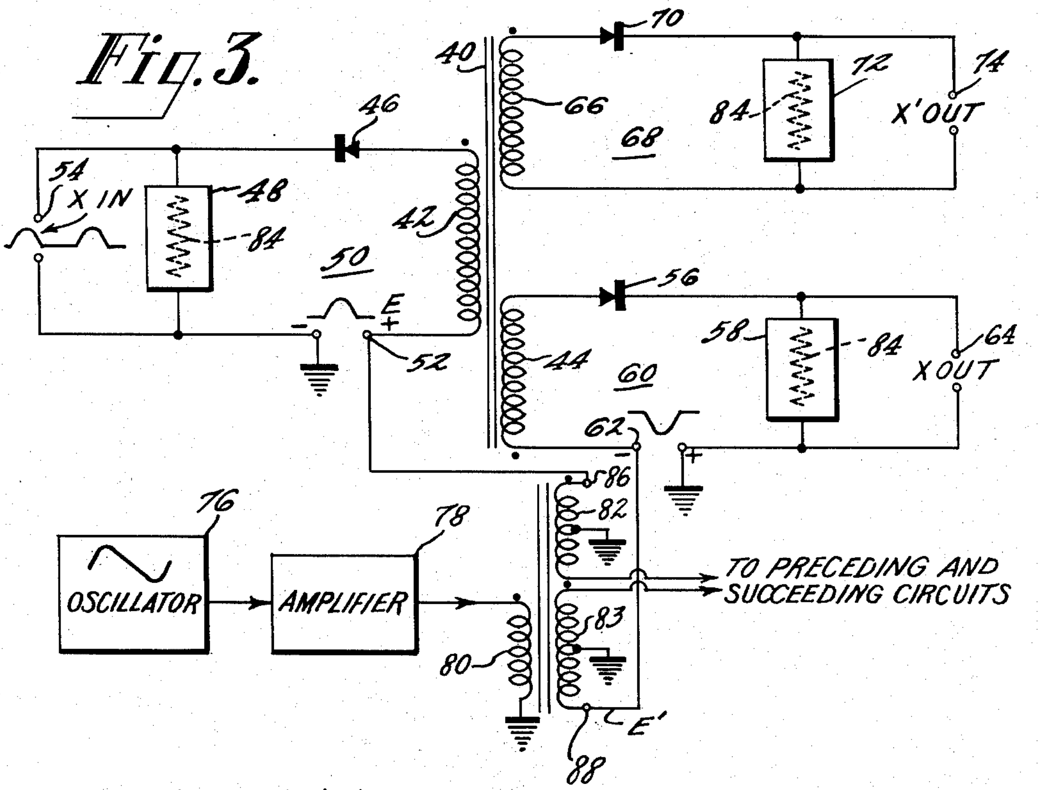
FIGURE 3 is a circuit diagram of a negation gate useful in the block diagram of FIGURE 2.

With reference to FIGURE 2, a timing pulse generator is made up of magnetic elements 20*a* 20*b*, 20*c*, 20*d*, and 20*e* of the delay gate type. Delay gate elements are represented by blocks enclosing the letter D. The first magnetic element comprising the timing pulse generator of FIGURE 2 is a negation gate 22. A negation gate has the same function as and is the counter part of the complementing circuit of FIGURE 1 using one core per bit type of magnetic circuits. A typical negation gate which may be employed in the arrangement of FIGURE 2 is illustrated in FIGURE 3. Suffice it to say for the present, that a negation gate (which is the same as a complementing circuit) produces a "one" output in the absence of an input signal, and conversely, produces a zero output in the presence of an input signal. The output of the negation gate 22 and the outputs of each of the delay gates 20*a*, 20*b*, 20*c*, 20*d*, and 20*e*, respectively, provide the successive time pulses TP1 through TP6, respectively. These delay gates are cascaded in the order named to form the shift register. The outputs of alternate delay gates 20*a* and 20*c* are coupled through an "or" gate 24 to the input of the negation gate 22. Here again, in a manner similar to that described in connection with FIGURE 1, the synchronizing source 28 is an alternating voltage functioning to shift (that is, transfer) information through the gates forming the timing pulse generator. In operation, the negation gate 22, receiving no inputs during the first half cycle of the synchronizing signal produces an output during the second half cycle. Each delay gate 20*a* through 20*e* then provides an output pulse in succession with each half cycle of the synchronizing signal. Thus, the first delay gate 20*a*, receiving the output of the negation gate 22, provides an output during the third half cycle of the synchronizing signal. This output in turn provides an input to the second delay gate 20*b* which produces an output on the fourth half cycle of the synchronizing signal, and so forth. Thus, a timing pulse is produced on an output of the timing pulse generator of FIGURE 2 every half cycle of the synchronizing signal.

Stated in another manner, when using this type of circuit, a pulse produced by the negation gate 22 encounters a time delay of a number of half cycles corresponding to the number of delay gates it encounters in its traverse of the shift register of FIGURE 2. Note that since the negation gate 22 can receive inputs only during alternate half cycles of the synchronizing signal from the register, only alternate timing pulses are fed back to the input of the negation gate 22 so as to coincide with the input half cycle. Thus, when the sixth timing pulse TP6 is not fed back to the input of the negation gate 22, one-half cycle later in the correct times sequence, the negation gate 22 produces the first timing pulse TP1. A particular advantage of the delay gate type of timing pulse generator exists because the negation gate input is self-starting. A "one" is automatically inserted into the delay gate shift register line.

In FIGURE 3, a delay gate type which has both the normal and the negation type of function is shown. A saturable magnetic core 40 is employed that has a substantially rectangular hysteresis characteristic. Opposite directions of flux in the core 40 are represented by states P and N. An electrical circuit is provided for driving the core 40 alternately from one direction of saturation P to the other direction of flux saturation N, and back to the P state. This circuit includes a first winding 42 and a second winding 44 linked to the core 40.

A first diode 46 and a first load impedance 48 are connected in a series circuit 50 with each other and with the first winding 42. A terminal 52, connected to the first winding 42, is employed for applying pulses E of alternately opposite polarities to the series circuit 50. This terminal 52 is called an alternating current (A.C.) terminal. One of the terminals of the load impedance 48 is connected to a common conductor, indicated by the conventional ground symbol, which also serves as the common ground for the A.C. pulses E. Input pulses, positive-going with respect to ground, are applied to a terminal 54 connected to the ungrounded terminal of the load impedance 48. A second series circuit 60 has a second diode 56, a second load impedance 58 and the second winding 44 connected in series in a manner similar to the first circuit 50. An A.C. terminal 62 is connected to the second winding 44 and employed for applying pulses E' of alternately opposite polarities to the second circuit 60. A terminal of the load impedance 58 is connected to ground. An output terminal 64 is connected to the ungrounded terminal of the second load impedance 58. A third winding 66 is linked to the core 40 and connected in a series circuit 68 with a third diode 70 and third load impedance 72. A terminal of the third load impedance 72 is grounded. A second output terminal 74 is connected to the ungrounded terminal of the third load impedance 72.

The pulses simultaneously applied to the A.C. terminals 52, 62 of the first and second circuit 50, 60 are of opposite polarities, respectively, that is one is positive-going when the other is negative-going. An oscillator 76 is employed for generating pulses of alternately opposite polarities. The oscillator 76 may be of the sine wave type or of any other appropriate type. The oscillator 76 is connected through an amplifier 78 to the primary 80 of a transformer. The transformer has two secondaries 82 and 83 each of which has a center tap connected to ground. The first of these secondary windings 82 has less windings than the other secondary winding 83 and accordingly provides smaller magnitude output signals. Dots adjacent to the leads of each of the transformer windings 80, 82, and 83 indicate the relative direction of winding in accordance with the usual transformer convention. Opposite polarity terminals 86, 88 on each of the transformer secondaries 82, 83 are respectively connected to the ungrounded A.C. terminals 52, 62 of the first and second circuits 50, 60. Accordingly, at any time a positive-going pulse is applied to one of the A.C. terminals 52, 62 a negative-going pulse is applied to the other, as indicated by the letters E and E′ (designating the opposite of E) in FIGURE 3.

The load impedances 48, 58, 72 may be simple resistances 84 or, alternatively, non-linear impedances such as are described in an article by R. A. Ramey in "Transactions of the American Institute of Electrical Engineers," January 1953, page 442, volume 71, 1952, above cited, FIGURE 5. The input terminal 54 may be the output terminal of a preceding magnetic device (not shown) with the load impedance 48 of the first circuit 50 acting as the load impedance of the output circuit 72 or 58 of the preceding device. In a similar manner, the output terminals 64, 74 may be connected to the inputs of succeeding magnetic devices (not shown). The input voltages X IN are positive-going half sine wave pulses of amplitude substantially equal to a half sine wave applied to the first circuit A.C. terminals 52. The amplitudes of pulses E, E′ are sufficient to provide saturating currents for the core 40 when impressed across the associated windings and X IN is greater than the positive part of E.

The dots adjacent to the leads of the three windings 42, 44, 66 indicate the relative directions of winding in accordance with the usual transformer convention. The relative polarities of the first and second windings 42, 44 and diode 46, 56 are such that the diodes 46, 56 only pass positive-going pulses E, E′, and block negative-going pulses, as shown in FIGURE 3. The relative polarities of the third winding 66 and diode 70 are such that a reversal of flux direction in the core 40 due to a current pulse in the first winding 42 in the forward direction of diode 46, caused by voltage E, induces a pulse in the third winding 66 that is blocked by the high back impedance of the third diode 70. However, a reversal of flux direction due to a current pulse in the second winding 44 in the forward direction of diode 56, caused by voltage E′, induces a pulse that is passed by the low forward impedance of the third diode 70.

Figure 4:
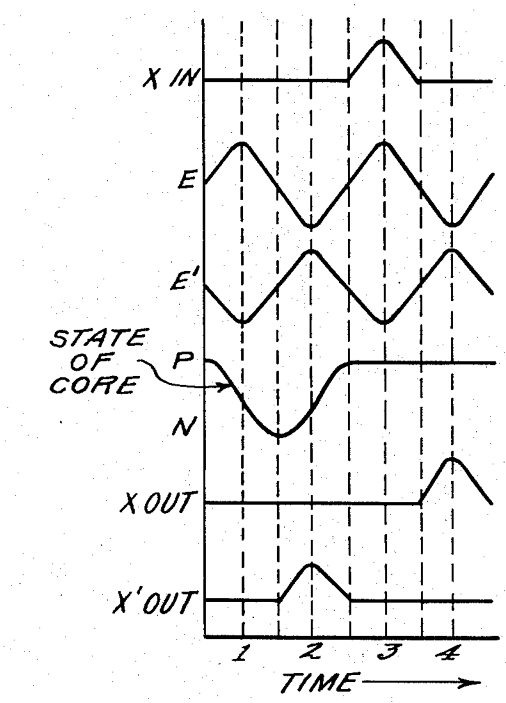
FIGURE 4 is an idealized graph of waveforms occurring in various portions of the circuit of FIGURE 3; and, FIGURE 5 is a block diagram illustrating an extension of the embodiment of FIGURE 2 wherein a relatively large number of clock pulses may be generated.

The waveforms in FIGURE 4 illustrate the operation of the circuit in FIGURE 3. The case first considered is that of no input pulse X IN. The polarities of the A.C. pulses E, E′ for the first half-cycle are as indicated in FIGURE 3, and in FIGURE 4 in the time interval 1. The core 40 is initially in the P state of substantial saturation. The first pulse applied to the first circuit A.C. terminal 52 is positive-going and is passed by the diode 46. The direction of winding 42 is such that the core is driven to the N state of saturation. The reversal of flux direction induces a voltage pulse in the second winding 44 that is of opposite polarity to the negative-going pulse E′. Thus, in the first half cycle there is substantially no current flow in the second winding. During the second half cycle, the interval 2, the pulse polarities at the A.C. terminals 52, 62 are reversed. Conduction in the first circuit 50 is blocked by the diode 46. The second diode 56 passes the positive-going pulse E′ which energizes the second winding 44 to return the core to the P state. The voltage drop across the second winding 44 during the change in flux direction to P is substantially equal to that of the pulse E′, since the impedance of the load 58 is relatively small. Thus, the voltage at the output terminal 64 is substantially unchanged.

When the core 40 was initially driven to the N state by the first half cycle pulse in the first winding 42, a voltage is induced in the third winding 66. However, this induced voltage is of such polarity that it is blocked by the high back impedance of the third diode 70. Thus, there is no output pulse produced at the terminal 74. However, when the core 40 is returned to its initial P state by the second half cycle pulse in the second winding 44, a pulse is induced in the third winding 66 which is passed by the third diode 70 and applied across the third load impedance 72. Thus, there is an output pulse X′ OUT. Accordingly, in the absence of an input pulse, X IN, there is no output pulse, X OUT from the second circuit 60, but there is an output pulse from the third circuit X′ OUT.

On the next cycle, if there is an input pulse X IN, the interval 3, the positive-going pulse E on the first circuit A.-C. terminals 52 is opposed by this input pulse. Accordingly, the A.-C. pulse E is inhibited and the core 40 remains in the initial P state. In the next half cycle, time interval 4, the A.-C. pulse E′ in the second circuit 60 is in the direction to saturate the core 40 in the P direction. However, since the core is already in the P direction, the second winding 44 offers very little impedance to the voltage pulse E′. As a result, substantially all of the voltage E′ appears across the impedance 58, and there is an output pulse, X OUT, at the terminal 64. Since the A.-C. pulse E′ does not reverse the flux direction of the core 40 there is no pulse induced in the third winding 66. Thus, there is no output pulse, X′ OUT at terminal 74. Thus, X OUT is the "same" as X IN (one may say X OUT implies X IN and X IN implies X OUT), and the X′ OUT is the opposite or negation of X IN, but both X OUT and X′ OUT are delayed one-half cycle from X IN.

Figure 5:
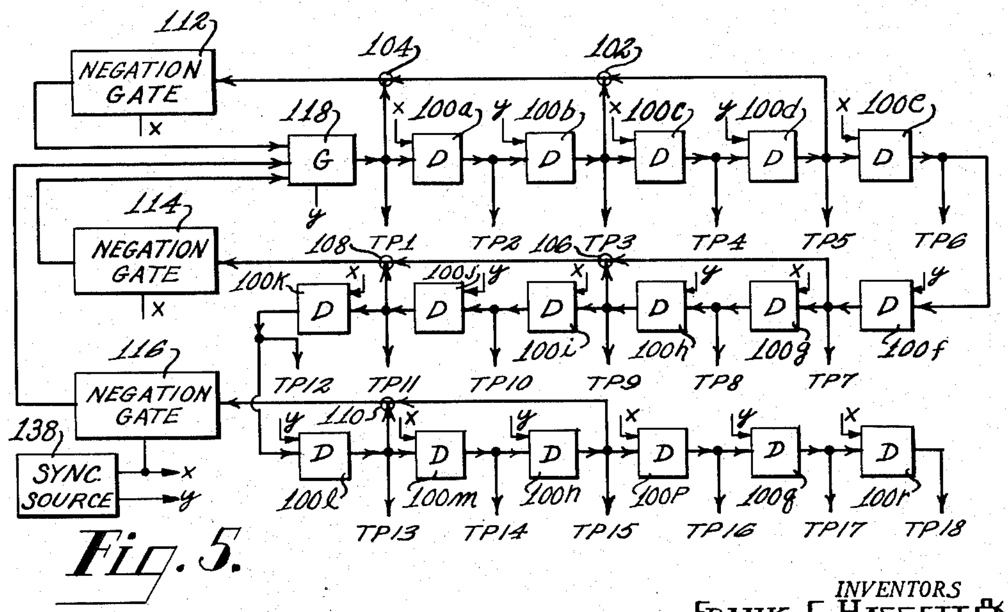

In the event a large number of timing pulses are required to be generated and since a signal loss may occur through a large number of "or" circuits it may become desirable to employ the circuit of FIGURE 5.

A timing pulse generator for providing relatively large numbers of timing pulses may be constructed using either the one core per bit type or the delay gate type magnetic element. In accordance with this technique, the buffered output of groups of these elements (each group being connected in cascade) is coupled to a common input coincidence element through complementing elements. This embodiment of the invention is illustrated in FIGURE 5 wherein a plurality of delay gates 100*a* to 100*r* are connected in cascade in a similar manner to that shown and described in FIGURE 2. In FIGURE 5, however, the timing pulse generator is constructed by coupling groups of the delay gates 100*a* to 100*r*, inclusive, through "or" circuits 102, 104, 106, 108, 110, respectively, and through negation (that is, complementing) gates 112, 114, 116 to a coincidence delay type gate 118 having three inputs. A coincidence delay gate is described in more detail on page 443 of the above-identified Ramey article and functions to provide an output upon the simultaneous occurrence of all inputs when properly driven by a synchronizing A.-C. signal from a source 138.

Considering the timing pulse generator of FIGURE 5 in more detail, the output of the coincidence delay gate 118 and the output of each of the respective gates 100*a* through 100*r*, respectively, provide 18 timing pulses TP1 through TP18, respectively. In addition, since this delay gate timing pulse generator operates to produce an output each half cycle of the synchronizing signal, alternate groups of the magnetic delay gates are fed back to the input. Thus, the output of the coincidence delay gate 118, delay gate 100*b*, and the delay gate 100*d* are coupled through "or" gates 102 and 104, respectively, and through the negation gate 112 to one of the inputs of the coincidence delay gate 118; a second group is formed from the alternate outputs of gates by coupling the output of gates 100*f*, 100*h* and 100*j* through "or" gates 106 and 108, and negation gate 114 to another of the inputs of the coincidence delay gate 118. Similarly, a third group is formed by coupling the outputs of delay gates 100*l* and 100*n* through the "or" circuit 110 and the negation gate 116 to the third input of the coincidence delay gate 118, thereby completing the timing pulse generator. The last three delay gates 100*p*, 100*q* and 100*r*, respectively, have no feedback coupling to the generator input. The fact that the final three stages of the timing pulse generator are not returned results from the fact that the feedback signal must pass through two delay gates (negation gate 116, and the coincidence delay gate 118) before being able to provide the first timing pulse for the second iteration of timing pulses.

The operation of the timing pulse generator of FIGURE 5 is similar to that of FIGURE 2, the primary difference being in the operation occurring after the fifteenth timing pulse TP15 and after a full cycle (positive and negative halves of synchronizing voltage E, FIG. 3) synchronizing signals have elapsed and the seventeenth timing pulse TP17 is generated. When the negation gate 116 fails to receive the seventeenth timing pulse TP17 (there being no feedback connection), the coincidence gate 118, being enabled by negation gates 112 and 114, produces an output which occurs delayed in time by one-half cycle of the synchronizing signal. It should be noted here that the additional half cycle required to pass through any of the negation gates 112, 114, 116, respectively, for which no output pulse is provided is compensated for by the delay gate 100*r* which provides the eighteenth timing pulse TP18.

Alternatively, the output of the timing pulse generator may be taken only from alternate gates. Thus, each pair of gates 100*a* and 100*b*, 100*c* and 100*d*, etc., constitutes one stage of the timing pulse generator. This single output from each stage may be taken from either gate of the pair. In this case a timing pulse is produced with each cycle of the synchronizing signal as results from a generator formed with the one core per bit type of magnetic element.

There has thus been provided a simple, reliable, and inexpensive time pulse generator that produces pulses in response to a synchronizing signal sequentially in plurality of parallel output channels. The possibility of spurious timing pulses being generated on the output channels is decreased and if such pulses do occur the error is corrected within one time pulse iteration of the generator.

What is claimed is:

1. A signal generating circuit comprising, in combination, a first non-complementing shift element and a second non-complementing shift element connected in cascade, and a negation gate through which the output of at least a said second shift element is coupled to the input of said first shift element for preventing said first shift element from producing an output when said second shift element output is activated.

2. A signal generating circuit comprising, in combination, means for receiving synchronizing signals, a first non-complementing shift element and a second non-complementing shift element connected in cascade, said first and said second elements being responsive to said synchronizing signals, and a negation circuit through which the output of at least said second shift element is coupled to the input of said first shift element for preventing said first shift element from producing an output when said second shift element output is activated.

3. A signal generating circuit comprising, in combination, means for receiving synchronizing signals, a first non-complementing magnetic shift element and a second non-complementing magnetic shift element connected in cascade, said first and said second magnetic elements being responsive to said synchronizing signals, and a negation gate through which the output of at least said second magnetic shift element is coupled to the input of said first magnetic shift element for preventing said first magnetic shift element from producing an output when said second shift element output is activated.

4. A signal generating circuit comprising, in combination, means for receiving synchronizing signals, a negation delay gate, a first non-complementing delay gate, and a second non-complementing delay gate connected in cascade in the order named, and each of said gates having an input and an output, said gates being responsive to said synchronizing signals, and means for coupling said first and second delay gate outputs to said negation delay gate input for preventing said negation gate from producing an output.

5. A signal generating circuit comprising, in combination, means for receiving synchronizing signals, a first non-complementing magnetic shift element and a second non-complementing magnetic shift element connected in cascade in the order named, said first and said second magnetic shift element being responsive to said synchronizing signals, and means comprising a negation gate through which the output of each of said magnetic shift element is coupled to said first magnetic shift element for preventing said first magnetic shift element from producing an output.

6. A pulse generating circuit for generating pulses on parallel output channels in response to input synchronizing signals comprising, in combination, a plurality of non-complementing magnetic elements connected in cascade to form a shift register, each of said elements having an input, an output, and a shift input, said shift input being responsive to said synchronizing signals, the first one of said elements also having an inhibit input to which a pulse may be applied for inhibiting said first element, said output of each of said magnetic elements being coupled to a different one of said output channels, and the output of at least some of said magnetic elements being applied to said inhibit input of said first element whereby only one pulse at a time occurs sequentially in each of said output channels.

7. A pulse generating circuit for generating pulses on parallel output channels in response to input synchronizing signals comprising, in combination, a plurality of non-complementing magnetic elements connected in cascade to form a shift register, each of said elements having an input, an output, and a shift input, said shift input being responsive to said synchronizing signals, a complementing magnetic element also having an input and a negation output, said negation output of said complementing element being coupled to said input of said second element, said output of at least some of said non-complementing magnetic elements being coupled to said first element input and to a respective one of said output channels.

8. A pulse generating circuit for generating pulses on parallel output channels in response to input synchronizing signals comprising, in combination, a plurality of non-complementing delay gates connected in cascade to form a shift register, each of said delay gates having an input, an output, and a shift input, said shift input being responsive to said synchronizing signals, the first one of said delay gates also having a complementing input circuit having an output the complement of its input, said complement output of said input circuit being coupled to said input of said first delay gate, said outputs of said delay gates being coupled as inputs to respective ones of said output channels and at least some of said outputs of said delay gates being coupled as inputs to said input circuit.

9. A pulse generating circuit for generating pulses on parallel output channels in response to input synchronizing signals comprising, in combination, a plurality of non-complementing delay gates connected in cascade to form a shift register, each of said delay gates having an input, an output, and a shift input, said shift input being responsive to said synchronizing signals, a complementing delay gate having an input and a negation output, said negation output being coupled to the input of the first of said delay gates, the outputs of alternate ones of said delay gates being coupled as inputs to respective ones of said output channels and to said complementing gate input.

10. A pulse generating circuit for generating pulses on parallel output channels in response to input synchronizing signals comprising, in combination, a plurality of non-complementing delay gates connected in cascade to form a shift register, each of said delay gates having an input, an output, and a shift input, said shift inputs being responsive to said synchronizing signals, a complementing delay gate input circuit having an output coupled to the input of the first in the cascade of said non-complementing gates, said output of said first complementing delay gate being coupled to said input of said first non-complementing delay gate, said output of alternate ones of said delay gates being coupled to said complementing delay gate circuit input, said output of each of said gates being coupled to a respective one of said output channels, whereby said complementing delay gate output introduces pulses to said shift register only in the absence of pulses on any of said output channels.

11. A timing pulse generator for generating sequential pulses on parallel channels in synchronism with input synchronizing signals comprising, in combination, a first and a second plurality of non-complementing magnetic delay gates responsive to said synchronizing signals to produce an output signal in the presence of a preselected input signal, each of said delay gates having an input and an output, said output of each of said gates of any one plurality, except that of the last gate thereof, being coupled to said input of a succeeding one of said gates of the same plurality, each of said outputs being coupled to a corresponding one of said parallel channels, a first negation delay gate, and a second negation delay gate, each of said first and said second negation delay gates having an input and a negation output and being responsive to said synchronizing signals to provide an output in the absence of an input signal at said input, said outputs of alternate ones of said first plurality of delay gates being coupled to said first negation gate input, said outputs of alternate ones of said second plurality of delay gates being coupled to said second negation gate input, and a coincidence delay gate having a first input and a second input connected, respectively, to said first and second negation gate outputs, respectively, said coincidence delay gate also having an output coupled to said input of the first said delay gate of said first plurality of delay gates, said coincidence delay gate being responsive to said synchronizing signals to provide an output upon the coincidence of signals from both said first and said second negation gate outputs.

12. A pulse generator for generating sequential pulses on parallel channels in synchronism with input clock signals comprising, in combination, a first and a second plurality of magnetic delay gates responsive to said clock signals to produce an output in the presence of a preselected input signal, each of said delay gates having an input and an output, said output of each of said gates of any one plurality except that of the last gate thereof being coupled to said input of a succeeding one of said gates of the same plurality, each of said outputs being coupled to a corresponding one of said parallel channels, a first negation delay gate, and a second negation delay gate, each of said first and said second negation delay gates having an input and a negation output, said negation gates being responsive to said clock signals to provide an output in the absence of an input signal at said input, a plurality of buffer gates, said outputs of alternate ones of said first plurality of delay gates being coupled through respective ones of said buffer gates to said first negation gate input, said outputs of alternate ones of said second plurality of delay gates being coupled through respective ones of said buffer gates to said second negation gate input, and a coincidence delay gate having a first input and a second input connected, respectively, to said first and second negation gate outputs, said coincidence delay gate also having an output coupled to said first delay gate input of said first plurality of delay gates, said coincidence delay gate being responsive to said synchronizing signals to provide an output upon the coincidence of signals from both said first and said second negation gate outputs.

13. A timing pulse generator for generating sequential pulses on parallel channels in synchronism with input clock signals comprising, in combination, a first and a second plurality of non-complementing magnetic amplifiers, the amplifiers of each of said plurality being connected in cascade to form a different shift register, said shift registers each having an input and each having outputs respectively from each of said magnetic amplifiers forming said register, a coincidence magnetic amplifier having a first and a second input and also having an output connected to the input of said shift register, each of said amplifiers being actuated by said clock signals, a first complementing magnetic amplifier and a second complementing magnetic amplifier, each of said complementing amplifiers being responsive to said clock signal and having an input and an output, the said outputs of alternate ones of said first plurality of amplifiers being coupled to said first complementing amplifier input and the said outputs of alternate ones of said second plurality of amplifiers being coupled to said second complementing amplifier input, said first complementing amplifier output and said second complementing amplifier output being coupled, respectively, to said first and said second coincidence amplifier inputs.

14. A timing pulse generator for generating sequential pulses on parallel channels in synchronism with input synchronizing signals comprising, in combination, a first and a second plurality of magnetic delay gates actuated by said synchronizing signals, said first and second pluralities of delay gates being respectively connected to form first and second shift registers, each of said shift registers having an input and having an output from each of said delay gates forming said register, a coincidence delay gate having a first and a second input and having an output connected to the input of said shift register and being actuated by said synchronizing signals, a first negation gate, and a second negation gate, each of said negation gates being responsive to said synchronizing signals and having an input and an output, the said output of said coincidence delay gate and alternate ones of said first plurality of delay gates being coupled to said first negation gate input, and the said outputs of alternate ones of said second plurality of delay gates being coupled to said second negation gate input, said first negation gate output and said second negation gate output being coupled respectively to said first and said second inputs of said coincidence delay gate.

15. In combination, a shift circuit including a plurality of stages; means for inserting a signal indicative of a binary digit at the input stage of the shift circuit; means for applying a recurrent shift voltage to all of said stages for shifting a signal indicative of said binary digit from stage to stage and for tending to enable said input stage; and means responsive to the shifting of said signal from stage to stage for inhibiting said input stage during the periods of said shift voltage tends to enable said input stage.

16. In combination, a shift register having an input stage, an output stage, and a plurality of other stages connected in cascade between said input and output stages; means for inserting a signal indicative of a binary digit at said input stage; means for applying a recurrent shift voltage to all of said stages for shifting a signal indicative of said binary digit from stage to stage through said register; and means responsive to the shifting of said signal from stage to stage for inhibiting said input stage, and to the shifting of said signal from said output stage for effectively enabling said input stage.

17. In combination, a shift register including a plurality of stages connected in cascade; means for inserting a signal indicative of binary digit at the input stage of said shift register; means for applying a periodically recurring shift voltage to all stages of said shift register for shifting a signal indicative of said binary digit from stage to stage through said register; means responsive to the shifting of said signal indicative of said binary digit from stage to stage for effectively inhibiting the input stage of said register and to the shifting of said signal from the output stage of said register for effectively enabling said input stage; and a plurality of output connections, one at each stage of said register, for deriving timing signals from said register.

18. A pulse generatng circuit for generating pulses on parallel output channels in response to input synchronizing signals comprising, in combination, a plurality of at least three non-complementing magnetic delay gates connected in cascade to form a shift register, each of said gates having an input, an output, and a shift input, said shift inputs being responsive to said synchronizing signals, a complementing delay gate having an input and output and producing at said output the negation of a signal applied to said input, said output being coupled to the input of the first in the cascade of said non-complementing gates, the outputs of each of said non-complementing delay gates, starting with the output of the first non-complementing delay gate, being coupled to said complementing delay gate input, the outputs of said gates being coupled to respective ones of said output channels, whereby said complementing delay gate output introduces pulses to said shift register only in the absence of pulses on any of said output channels.

19. In combination, first, second, and third shift elements, connected in cascade, in the order named, each having a shift input terminal to which a recurrent shift signal may be applied for shifting a signal indicative of a binary digit from element to element, and said first element also including an inhibit input terminal to which an inhibit signal may be applied for inhibiting said element; and a feedback circuit extending from the output of at least said second shift element to said inhibit input terminal for inhibiting said first shift element in the presence of an output signal from said second shift element.

References Cited in the file of this patent

UNITED STATES PATENTS

| | | |
|---|---|---|
| 2,709,798 | Steagall | May 31, 1955 |
| 2,710,952 | Steagall | June 14, 1955 |
| 2,729,755 | Steagall | Jan. 3, 1956 |
| 2,783,456 | Steagall | Feb. 26, 1957 |
| 2,828,477 | Lanning | Mar. 25, 1958 |
| 2,834,006 | Kaufmann | May 6, 1958 |